United States Patent
Zhang et al.

(10) Patent No.: US 11,277,806 B2
(45) Date of Patent: Mar. 15, 2022

(54) APPARATUS AND METHOD FOR PERFORMING A RANDOM ACCESS IN A WIRELESS COMMUNICATION SYSTEM

(71) Applicant: Samsung Electronics Co., Ltd., Suwon-si (KR)

(72) Inventors: Shichang Zhang, Beijing (CN); Bin Yu, Beijing (CN); Chengjun Sun, Beijing (CN)

(73) Assignee: Samsung Electronics Co., Ltd., Suwon-si (KR)

(*) Notice: Subject to any disclaimer, the term of this patent is extended or adjusted under 35 U.S.C. 154(b) by 36 days.

(21) Appl. No.: 16/947,287

(22) Filed: Jul. 27, 2020

(65) Prior Publication Data

US 2020/0359342 A1 Nov. 12, 2020

Related U.S. Application Data (63) Continuation of application No. 16/280,287, filed on Feb. 20, 2019, now Pat. No. 10,728,864, which is a
(Continued)

(30) Foreign Application Priority Data

Sep. 27, 2013 (CN) .......................... 201310452017.6

(51) Int. Cl.
*H04W 56/00* (2009.01)
*H04W 72/02* (2009.01)

(52) U.S. Cl.
CPC ........... *H04W 56/00* (2013.01); *H04W 72/02* (2013.01)

(58) Field of Classification Search
CPC .............................. H04W 56/00; H04W 72/02
See application file for complete search history.

(56) References Cited

U.S. PATENT DOCUMENTS

| 8,462,688 | B1 * | 6/2013 | Dinan ................. | H04W 74/006 370/312 |
| 2010/0080197 | A1 | 4/2010 | Kanellakis et al. | |

(Continued)

FOREIGN PATENT DOCUMENTS

| JP | 2011519196 A | 6/2011 |
| KR | 20130103442 A | 9/2013 |
| WO | 2014116636 A1 | 7/2014 |

OTHER PUBLICATIONS

International Search Report dated Jan. 16, 2015 in connection with International Application No. PCT/KR2014/009081; 3 pages.
(Continued)

*Primary Examiner* — Ricky Q Ngo
*Assistant Examiner* — Stephen N Steiner (57) ABSTRACT

The present application discloses a method for data transmission in a radio cell of a mobile terminal. The radio cell includes an auxiliary carrier in a low frequency band and at least one master carrier in a high frequency band, the method including: the mobile terminal achieving downlink synchronization with the radio cell through the auxiliary carrier in the low frequency band, and after achieving the downlink synchronization, obtaining configuration information of the radio cell, and transmitting data by using the master carrier and/or the auxiliary carrier according to the configuration information. The present application also provides a mobile terminal. By using the present application, radio cell coverage and transmission performance may be improved.

4 Claims, 4 Drawing Sheets

Related U.S. Application Data continuation of application No. 16/211,783, filed on Dec. 6, 2018, now Pat. No. 10,728,863, which is a continuation of application No. 15/025,534, filed as application No. PCT/KR2014/009081 on Sep. 29, 2014, now Pat. No. 10,531,409.

(56) References Cited

U.S. PATENT DOCUMENTS

| | | |
|---|---|---|
| 2011/0013546 A1 | 1/2011 | Hao et al. |
| 2011/0182174 A1 | 7/2011 | Pi et al. |
| 2013/0010641 A1 | 1/2013 | Dinan |
| 2013/0039268 A1 | 2/2013 | Blankenship et al. |
| 2013/0044686 A1 | 2/2013 | Yen |
| 2013/0235851 A1 | 9/2013 | Abu-Surra et al. |
| 2013/0242730 A1* | 9/2013 | Pelletier ............... H04L 1/0046 370/230 |
| 2014/0044092 A1 | 2/2014 | Guan et al. |
| 2015/0109943 A1* | 4/2015 | Sahin ................... H04W 24/02 370/252 |

OTHER PUBLICATIONS

Written Opinion of the International Searching Authority dated Jan. 16, 2015 in connection with International Application No. PCT/KR2014/009081; 5 pages.
Zhouyue Pi and Farooq Khan, "An Introduction to Millimeter-Wave Mobile Broadband Systems," pp. 105-107, 2011.
Non-Final Office Action for U.S. Appl. No. 16/211,783 dated Sep. 17, 2019, 11 pages.

\* cited by examiner

APPARATUS AND METHOD FOR PERFORMING A RANDOM ACCESS IN A WIRELESS COMMUNICATION SYSTEM

CROSS-REFERENCE TO RELATED APPLICATIONS

This application is a continuation of application Ser. No. 16/280,287, filed Feb. 20, 2019, which is a continuation of application Ser. No. 16/211,783, filed Dec. 6, 2018, which is a continuation of application Ser. No. 15/025,534, which is the National Stage of International Application No. PCT/KR2014/009081, filed Sep. 29, 2014, now U.S. Pat. No. 10,531,409, which claims priority to Chinese Patent Application No. 2013-10452017.6, filed Sep. 27, 2013, the disclosures of which are incorporated herein by reference into the present disclosure as if fully set forth herein.

BACKGROUND

1. Field

The present disclosure relates to mobile communication data transmission, and particularly to a mobile terminal and a method for data transmission in a radio cell thereof.

2. Description of Related Art

Nowadays, with popularity of intelligent mobile terminals and development of wireless internet services, mobile data services tend to be booming, which brings unprecedented challenges for wireless networks. To meet mobile broadband requirements, currently 4G Long Time Evolution (LTE) networks adopt various technologies such as carrier aggregation (CA), large scale MIMO, Coordinated Multi-Point (CoMP), etc. to improve wireless network capacity, and to further improve frequency spectrum effectiveness, researches for small cells are being actively pushed.

However, since the range of carrier frequencies currently being used for wireless communication is 700 MHz-2.6 GHz, and bandwidth of available frequency spectrum resources is still very limited, new technologies such as CA, large scale MIMO, CoMP, etc. only improve peak communication rate of a single subscriber or frequency spectrum effectiveness of a certain cell to some extent, and in the given range of the frequency spectrum resources, improvements to wireless network capacity are limited, which may not meet the increasing capacity requirement. Especially, it is predicted that compared to what it is now, by year 2020, the wireless network capacity may grow 1000 times, and the capacity requirement may not be met by only improving the frequency spectrum efficiency. While with the heterogeneous network architecture being put forward, though deployment technologies of more intensive small cells are still developing and the frequencies are reused by way of increasing low power access points to improve the capacity, subjected to influences by factors such as base station site selection, device installation, backhaul network construction, etc., costs of realizing small cells are very high, and to increase the capacity, simply increasing the number of small cell sites is not enough. To make the increase of the capacity and the number of small cells be a linear relation, the most important thing is to solve the co-channel interference caused by reusing the frequencies, and being heavily dependent on high level interference elimination technologies is not what is expected. So only by using the small cell technology, it is difficult to meet the increasing wireless data service requirement. Obviously, multi-dimensional capacity improvement methods are effective ways to meet future requirements. That is, an overall capacity requirement may be realized by way of using more small cells, improving the frequency efficiency, improving the frequency spectrum utilization, and introducing more frequency spectrum resources.

However, the frequency spectrum resources are rare and frequency spectrum resources of low frequency bands are very congested (e.g., 700 MHz~2.6 GHz currently being used in wireless communication), and there is a tendency of developing higher frequency bands. To meet the requirement of the predicted 1000 times capacity increase by year 2020, the gap of the frequency spectrum is still large. In this circumstance, people pay more and more attention on high frequency band communication technologies. Millimeter wave communication technology is a most representative high frequency band communication technology, and generally millimeter wave has a frequency spectrum from 26.5 GHz to 300 GHz. It may be seen that, besides frequency bands of 57 GHz~64 GHz and of 164 GHz~200 GHz that are susceptible to oxygen and water losses, the millimeter wave is able to provide bandwidth up to 230 GHz, which is more than 100 times of that of the frequency spectrum resources currently being used, and may meet the wideband wireless data service requirements better. This is the reason why the millimeter wave communication is widely concerned.

However, the millimeter wave has weaknesses that it may not evade. First, frequencies of the millimeter wave are higher than carrier frequencies currently being used for wireless communication. According to a classical free-space path loss rule, i.e., LFSL=32.4+20 log 10f+20 log 10R, where LFSL is free-space path loss represented by dB, f is a carrier frequency, R is a distance between a transmitter and a receiver, the free-space path loss that the millimeter wave with the lowest frequency (26.5 GHz) confronts is 20 dB higher than the path loss that the highest frequency carrier (2.6 GHz) for wireless communication confronts. Therefore, if the millimeter wave is used to cover wireless communication cells, the weakness will dramatically influence the coverage of the millimeter wave cells. Besides this, in an actual wireless communication environment, the oxygen and water in the air will absorb energy of the millimeter wave, which further influences the propagation distance of the millimeter wave.

An ideal method that solves the above defect of the millimeter wave is to combine the large-scale MIMO technology and the beamforming technology. The method may concentrate energy of the millimeter wave on a very narrow wave beam so that propagation of the millimeter wave has very strong directivity, and during point-to-point downlink transmission, it may guarantee better coverage. However, for a real wireless communication cell, besides the point-to-point downlink transmission, there are other downlink transmissions dedicated for multiple users, for example, broadcast messages of synchronization channels, public control channels, and cells, and transmission of the information will aim at multiple users, but, generally, different users may be distributed on different locations of a cell, and a narrow band beam realized by beamforming may only be directed to one direction, therefore, the broadcast messages of the synchronization channels, public control channels and cells may only be transmitted by using a traditional way so as to give consideration to the users in the whole cell. Compared to that of the point-to-point downlink transmission that uses the beamforming technology, energy of wireless signals that carry the broadcast messages of the synchronization channels, public control channels and cells is more diffused so that under a same transmission power condition, their coverage will be smaller than that of the point-to-point downlink transmission signals. Realization of beamforming relies on estimates of radio channels, while estimates of radio channels is generally realized by using a reference signal, but during an actual communication process, during transmission of messages at an initial stage of establishing a connection between a wireless terminal and a base station, e.g., a first downlink message, the base station is unable to obtain information of radio channels, which will affect coverage of wireless signals that carry the messages, however, the messages are critical for establishing a wireless link between the terminal and the base station.

In addition, due to restriction on sizes of mobile terminals, generally, large scale MIMO may not be performed on a terminal side. That is, scale of an antenna array on a terminal side is far smaller than scale of an antenna array on a base station side. Therefore, during uplink transmission, concentration degree of beams will be smaller than that of beams during point-to-point downlink transmission, and there is an asymmetric problem existing in coverage of uplink and downlink signals.

SUMMARY

It may be seen from the above analysis that by using the large-scale MIMO technology and the beamforming technology, coverage of point-to-point downlink transmission in a millimeter wave cell may be improved. Generally, point-to-point downlink transmission carries data services of terminals, which occupies a main ratio of data transmission of a cell, and the point-to-point downlink transmission needs support of uplink transmission, while broadcast messages of synchronization channels and public control channels and messages at an initial stage of establishing a wireless link are all necessary to support running a cell, if coverage of wireless signals that carry these signals is limited, it will be a bottle neck of improving coverage of a millimeter wave cell. There is still no effective way to solve the problem.

Since the higher a frequency band is, the larger path loss attenuation is, and thus, the smaller the coverage of a cell realized by using a corresponding carrier is.

Therefore, besides millimeter wave cells, when a cell is constructed by using other carriers on frequency bands with higher frequencies, the problem of the coverage being reduced may also exist.

The present application proposes a mobile terminal and a method for data transmission in a radio cell thereof, which may efficiently improve coverage of a high frequency band cell, and further improve performance of the high frequency band cell.

To realize the above object, the present application adopts the following technical solutions.

A method for data transmission in a radio cell of a mobile terminal, in which the radio cell comprises an auxiliary carrier in a low frequency band and at least one master carrier in a high frequency band, the method includes:

the mobile terminal achieving downlink synchronization with the radio cell through the auxiliary carrier in the low frequency band, and after achieving the downlink synchronization, obtaining configuration information of the radio cell, and transmitting data by using the master carrier and/or the auxiliary carrier according to the configuration information.

Preferably, the master carrier is a carrier in a millimeter wave frequency band, and the radio cell is a millimeter wave cell.

Preferably, the auxiliary carrier is configured to bear a downlink synchronization channel and a first broadcasting channel;

the mobile terminal achieving the downlink synchronization with the radio cell through the auxiliary carrier in the low frequency band includes: the mobile terminal achieving initial downlink synchronization with a base station of the radio cell by using a downlink synchronization signal sent by the auxiliary carrier; and obtaining the configuration information of the radio cell includes: the mobile terminal obtaining configuration information of the radio cell borne on a first broadcast channel according to a first broadcast channel signal sent by the auxiliary carrier; and the mobile terminal reading a second broadcast channel from the master carrier according to the configuration information of the radio cell borne on the first broadcast channel, and obtaining configuration information of the radio cell borne on the second broadcast channel.

Preferably, the configuration information of the radio cell borne on the first broadcast channel includes information on a bandwidth of the auxiliary carrier, a system frame number of the auxiliary carrier, a frequency of the master carrier, a bandwidth of the master carrier, a radio frame structure of the master carrier, and downlink cyclic prefix length of the master carrier; and the configuration information of the radio cell borne on the second broadcast channel includes a public configuration of a sounding reference signal SRS on the master carrier and an uplink random access PRACH configuration of the radio cell; and the PRACH configuration of the radio cell comprises PRACH configuration information on the master carrier and/or on the auxiliary carrier.

Preferably, the auxiliary carrier is configured to bear a downlink synchronization channel, a first broadcast channel, a public control channel and a second broadcast channel;

the mobile terminal achieving the downlink synchronization with the radio cell through the auxiliary carrier in the low frequency includes: the mobile terminal carrying out initial downlink synchronization with a base station of the radio cell by using a downlink synchronization signal sent by the auxiliary carrier; and a way to obtain the configuration information of the radio cell includes: the mobile terminal obtaining the configuration information of the radio cell according to a first broadcast channel signal, a public control channel indication and a second broadcast channel signal.

Preferably, the configuration information of the radio cell includes a bandwidth of the auxiliary carrier, a system frame number of the auxiliary carrier system, a frequency of the master carrier, a bandwidth of the master carrier, a radio frame structure of the master carrier, a public configuration of a sounding reference signal SRS on the master carrier and an uplink random access PRACH configuration of the cell; and the PRACH configuration of the cell includes PRACH configuration information on the master carrier and/or on the auxiliary carrier.

Preferably, the method further includes: when the public control channel only existing in the auxiliary carrier, the mobile terminal in idle status only monitoring the downlink control channel on the auxiliary carrier to obtain a paging message and a broadcast message.

Preferably, the first broadcast channel is a master broadcast channel, and the second broadcast channel is a common broadcast channel.

Preferably, when the mobile terminal transmits data by using the master carrier and/or the auxiliary carrier, a process of establishing a connection with the base station initiated by the mobile terminal includes:

the mobile terminal performing the uplink synchronization with the base station by using the PRACH configuration of the radio cell and carrying out sending and receiving of related messages during the process of establishing the connection, until receiving radio resource configuration information specific for the mobile terminal.

Preferably, the radio resource configuration information specific for the mobile terminal includes: SRS specific configuration information of the mobile terminal on the master carrier and on the auxiliary carrier, uplink control channel specific configuration information of the terminal on the master carrier and on the auxiliary carrier, and uplink and downlink transmission channel specific configuration information of the terminal on the master carrier and on the auxiliary carrier.

Preferably, the mobile terminal performing the uplink synchronization with the base station by using the PRACH configuration of the radio cell includes:

if the PRACH configuration of the radio cell not comprising a PRACH configuration on the master carrier and including a PRACH configuration on the auxiliary carrier, then the mobile terminal performing the uplink synchronization according to the PRACH configurations on the auxiliary carrier; and/or if the PRACH configuration of the radio cell including the PRACH configurations on the master carrier and on the auxiliary carrier, then the mobile terminal only performing the uplink synchronization on the master carrier or on the auxiliary carrier, or the mobile terminal selecting the master carrier or the auxiliary carrier to perform the uplink synchronization according to a current radio environment.

Preferably, the mobile terminal selecting the master carrier or the auxiliary carrier to perform the uplink synchronization according to the current radio environment includes: if the current radio environment being superior than a predefined threshold, then the mobile terminal selecting the master carrier to perform the uplink synchronization, or otherwise, the mobile terminal selecting the auxiliary carrier to perform the uplink synchronization.

Preferably, during a process of establishing an initial connection, a carrier that receives and sends messages related to the process of establishing the connection is the same with a carrier where the PRACH is located.

Preferably, when transmitting data by using the master carrier and/or the auxiliary carrier, for downlink transmission on the auxiliary carrier, the mobile terminal detects a downlink transmission instruction on the auxiliary carrier and transmits ACK/NACK information of the downlink transmission.

Preferably, when transmitting data by using the master carrier and/or the auxiliary carrier, for downlink transmission on the master carrier, the mobile terminal detects a downlink transmission instruction on the auxiliary carrier and transmits ACK/NACK information of the downlink transmission; or the mobile terminal detects the downlink transmission instruction on the master carrier and transmits the ACK/NACK information of the downlink transmission.

Preferably, for the downlink transmission on the master carrier, when the mobile terminal detects the downlink transmission instruction on the auxiliary carrier and transmits the ACK/NACK information, a feedback time sequence of the ACK/NACK information is determined according to downlink and uplink configurations of the master carrier and the auxiliary carrier.

Preferably, when transmitting data by using the master carrier and/or the auxiliary carrier, for the uplink transmission on the auxiliary carrier, the mobile terminal receives uplink transmission scheduling and receives feedback information of the uplink transmission on the auxiliary carrier; and/or for the uplink transmission on the master carrier, the mobile terminal receives the uplink transmission scheduling and the feedback information of the uplink transmission on the master carrier.

Preferably, the master carrier of the radio cell includes at least one controlling master carrier and at least one controlled master carrier;

a radio frame structure of the controlling master carrier includes downlink sub-frames and configurable sub-frames; the configurable sub-frames including a special downlink time slot, a guard time slot, and an uplink pilot time slot; and all sub-frames in a radio frame structure of the controlled master carrier are uplink sub-frames, or the controlled master carrier has a downlink and uplink time division duplex radio frame structure.

Preferably, the PRACH configuration of the radio cell contained in a second broadcast channel signal is a PRACH configuration of the controlled master carrier and/or the auxiliary carrier; and when the mobile terminal performs uplink synchronization with the base station, if the PRACH configuration of the radio cell does not include the PRACH configuration of the controlled master carrier, and includes the PRACH configuration on the auxiliary carrier, then the mobile terminal performs the uplink synchronization according to the PRACH configuration on the auxiliary carrier; and/or if the PRACH configuration of the radio cell includes the PRACH configurations on the controlled master carrier and on the auxiliary carrier, then the mobile terminal only performs the uplink synchronization on the controlled master carrier or on the auxiliary carrier, or the mobile terminal selects the controlled master carrier or the auxiliary carrier to perform the uplink synchronization according to a current radio environment.

Preferably, when transmitting data by using the master carrier and/or the auxiliary carrier, for the downlink transmission on the controlling master carrier, the mobile terminal detects a downlink transmission instruction on the auxiliary carrier and transmits ACK/NACK information of the downlink transmission; or the mobile terminal detects the downlink transmission instruction on the controlling master carrier and transmits the ACK/NACK information of the downlink transmission on the controlled master carrier.

Preferably, for the downlink transmission on the controlling master carrier, when the mobile terminal detects the downlink transmission instruction on the auxiliary carrier and transmits the ACK/NACK information, a feedback time sequence of the ACK/NACK information is determined according to downlink and uplink configurations of the auxiliary carrier; and when the mobile terminal detects the downlink transmission instruction on the controlling master carrier and transmits the ACK/NACK information on the controlled master carrier, the feedback time sequence of the ACK/NACK information is determined according to uplink and downlink configurations of the controlled master carrier.

Preferably, when transmitting data by using the master carrier and/or the auxiliary carrier, for the downlink transmission on the controlled master carrier, the mobile terminal detects a downlink transmission instruction on the auxiliary carrier and transmits ACK/NACK information of the downlink transmission; or the mobile terminal detects the downlink transmission instruction on the controlling master carrier, and transmits the ACK/NACK information of the downlink transmission on the controlled master carrier; or the mobile terminal detects the downlink transmission instruction on the controlled master carrier and transmits the ACK/NACK information of the downlink transmission.

Preferably, for the downlink transmission on the controlled master carrier, when the mobile terminal detects the downlink transmission instruction on the auxiliary carrier and transmits the ACK/NACK information, a feedback time sequence of the ACK/NACK information is determined according to uplink and downlink configurations of the auxiliary carrier and the controlled master carrier; and when the mobile terminal detects the downlink transmission instruction on the controlling master carrier and transmits the ACK/NACK information on the controlled master carrier, the feedback time sequence of the ACK/NACK information is determined according to the downlink and uplink configurations of the controlled master carrier.

Preferably, when transmitting data by using the master carrier and/or the auxiliary carrier, for the uplink transmission on the controlled master carrier, the mobile terminal detects uplink transmission scheduling on the auxiliary carrier and receives feedback information of the uplink transmission; and the mobile terminal receives the uplink transmission scheduling on the controlling master carrier and the feedback information of the uplink transmission.

Preferably, a radio frame structure of the auxiliary carrier includes downlink sub-frames, uplink sub-frames, and special sub-frames; wherein the special sub-frames include a downlink time slot, a guard interval, and an uplink time slot, and the guard interval is configured for transition from the downlink time slot to the uplink time slot.

A mobile terminal in a radio cell includes an auxiliary carrier in a low frequency band and at least one master carrier in a high frequency band, wherein the mobile terminal includes: a downlink synchronization unit, a configuration information obtaining unit, and a data transmission unit; wherein the downlink synchronization unit is configured to perform initial downlink synchronization with a base station of the radio cell by using the auxiliary carrier;

the configuration information obtaining unit is configured to obtain configuration information of the radio cell; and the data transmission unit is configured to transmit data by using the master carrier and/or the auxiliary carrier according to the configuration information of the radio cell.

Preferably, the configuration information obtaining unit is further configured to receive a first broadcast channel signal sent by the auxiliary carrier, obtain the configuration information of the radio cell borne by a first broadcasting channel; and is also configured to read a second broadcast channel from the master carrier according to the configuration information of the radio cell borne by the first broadcasting channel, and obtain the configuration information of the radio cell borne by the second broadcast channel.

Preferably, the configuration information obtaining unit is configured to obtain the configuration information of the radio cell according to a first broadcast channel signal, a public control indication and a second broadcast channel signal sent by the auxiliary carrier.

Preferably, the data transmission unit is further configured to receive a public channel signal sent by the auxiliary carrier and perform the data transmission according to the public channel signal.

By way of the method provided according to the present application, a radio cell not only includes a master carrier in a high frequency band but also includes an auxiliary carrier in a low frequency band, and data transmission of the mobile terminal is realized by using a low frequency carrier to support running of a high frequency band cell, with features that a low frequency carrier transmission having a large transmission scope and having wide coverage, coverage of the whole radio cell is improved. Besides of these, the method provided according to the present application improves reliability of radio signaling, and improves performance of the radio cell, especially performance of a high frequency band cell.

DETAILED DESCRIPTION

To make the object, technical means and advantages of the present application clearer, detailed description will be provided in combination with attached drawings in the following.

In a method for data transmission in a radio cell of a mobile terminal according to the present application, and in a method for realizing a radio cell based on low frequency auxiliary carriers and master carriers in a high frequency band, a radio cell at least supports two kinds of carriers. The first kind of carrier is master carrier, which may be one or more. A master carrier is a high frequency band carrier, used to provide downlink data service transmission. Another kind of carrier is auxiliary carrier, and an auxiliary carrier is a low frequency carrier, e.g., a carrier in 700 MHz-2.6 GHz frequency band currently being used for wireless communication. In the present application, a frequency band carrier, a frequency band difference between which and the highest frequency band of low frequency carriers is larger than a preset threshold is called a high frequency band carrier; the frequency band difference refers to a result of a high frequency band minus the highest frequency band of the low frequency carriers.

The low frequency feature of the auxiliary carrier is mainly used to realize coverage of point-to-multi-point cells. Most basically, the auxiliary carrier may be used to bear downlink synchronization channels and used for a larger range of UEs to perform downlink synchronization with a high frequency band cell. Besides bearing the downlink synchronization channels, the auxiliary carrier may also be configured to bear point-to-multi-point downlink data transmission of broadcast channels and/or public control channels, etc., bear data transmission of a part of important downlink sharing channels (e.g., signaling transmission of a control panel), and at the same time may bear data transmission of a part of or all uplink random access channels, uplink control channels, and uplink sharing channels. The master carrier is mainly used to realize point-to-point service data transmission, and especially when a master carrier is a millimeter, broadband and super broadband service data transmission may be realized.

For a radio frame structure of the carriers, the master carrier adopts a current FDD or TDD frame structure defined by the LTE or a newly defined frame structure. The auxiliary carrier adopts a kind of frame structure similar to the TDD format frame structure defined by the LTE. That is, a radio frame of an auxiliary carrier includes downlink sub-frames, uplink sub-frames and special sub-frames. A special sub-frame includes a downlink time slot, a guard interval and an uplink time slot. The guard interval is configured for transition from a downlink time slot to an uplink time slot. The number of downlink sub-frames, uplink frames and special sub-frames and their locations may be configured as needed by the network, e.g., by adopting any of the 7 TDD frame structures defined by the LTE.

Actual transmission points of the master carrier and the auxiliary carrier may be the same or different, and if in the latter case, average latency between a transmission point of the master carrier and a transmission point of the auxiliary carrier and a same receiving point should be the same or a latency difference between them should be in a range acceptable for a receiver.

Based on the above construction of the radio cell carriers, in the present application, a basic method for data transmission in a radio cell of the mobile terminal includes: the mobile terminal achieving downlink synchronization with the radio cell via the low frequency auxiliary carrier, and after the mobile terminal achieving the downlink synchronization with a base station of the radio cell, obtaining configuration information of the radio cell, the master carrier and the auxiliary carrier, and transmitting data by using the master carrier and/or the auxiliary carrier according to the corresponding configuration information. By using the low frequency feature of the auxiliary carrier to help the radio cell containing the high frequency carrier to enlarge coverage, the system performance is improved.

Figure 1:
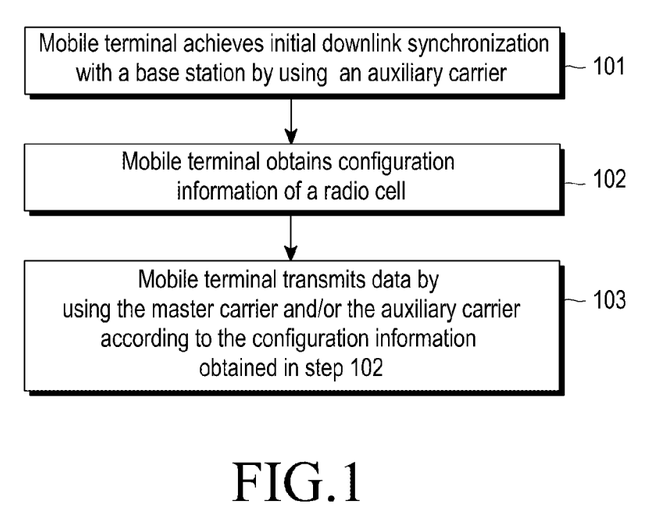
FIG. 1 shows a schematic diagram of a basic flow of a method for data transmission of the present application.

The method for data transmission in a radio cell of the mobile terminal will be described hereinafter based on FIG. 1. As shown in FIG. 1, the method includes the following process.

At step 101, the mobile terminal uses the auxiliary carrier to realize initial downlink synchronization with the base station.

First, the mobile terminal performs downlink synchronization with the base station. Preferably, the auxiliary carrier may be used on a fixed position to send a downlink synchronization signal to realize initial downlink time synchronization between the terminal and the base station. Since the auxiliary carrier is in a low frequency band, therefore the coverage of point-to-multi-point transmission thereof may be larger, and downlink synchronization of mobile terminals in a larger range may be realized.

At step 102, the mobile terminal obtains configuration information of the radio cell, the master carrier and the auxiliary carrier according to broadcast channel signals of the cell.

Broadcast messages of the cell may be borne by using a first broadcast channel and a second broadcast channel, in which the first broadcast channel and the second broadcast channel are divided according to content that they bear. Preferably, the first broadcast channel may be a master broadcast channel, bearing master broadcast messages (Master Information Block), and the second broadcast channel may be a common broadcast channel, bearing common system broadcast messages (System Information Block). The broadcast messages at least include information such as a bandwidth of the ancillary carrier, a frequency of the master carrier, a bandwidth of the master carrier, a radio frame structure of the master carrier, uplink & downlink cyclic prefix length of the master carrier, PRACH resource configurations of the cell, etc. Besides these, other related information may be used to inform the terminal of sounding reference signal configurations thereof on the master carrier, in which public configurations are included in the broadcast messages, and the dedicated configurations may be obtained from other subsequent messages.

In the above broadcast signals, the PRACH resource configurations of the cell may be PRACH resource configurations on the master carrier or PRACH resource configurations on the auxiliary carrier.

The broadcast messages are carried by the first broadcast channel signal and the second broadcast channel signal. Preferably, the first broadcast channel signal may be borne by the auxiliary carrier so as to improve the coverage of the first broadcast channel signal by using the low frequency feature of the auxiliary carrier.

At step 103, the mobile terminal performs data transmission by using the master carrier and/or the auxiliary carrier according to the configuration information obtained from step 102.

Based on the configuration information of the cell and the carriers, information such as the bandwidth, the frame structure, etc. of the carriers may be determined and may be used to perform data transmission.

When the data transmission is performed, preferably, the auxiliary carrier may be used to feed back ACK/NACK (Acknowledge/Non-acknowledge) information of the downlink transmission. The ACK/NACK information may be carried in the uplink control channels or uplink sharing channels in the auxiliary carrier, and in this case, a time sequence of downlink HARQ is decided by the frame structure of the auxiliary carrier and the frame structure of one or more carriers where the downlink transmission is performed.

The auxiliary carrier may be further configured to transmit downlink data of the mobile terminal, and the downlink data mainly refers to information with a high priority such as high level signaling, etc.

To facilitate understanding of the present application, the above technical solution of the present application will be further described hereinafter in combination with specific application scenarios. As an example, the master broadcast channel is the first broadcast channel, and the common broadcast channel is the second broadcast channel.

Application Scenario 1

In the present application scenario, a radio cell A includes more than two (including two) carriers, in which one of the carriers is a low frequency auxiliary carrier (such as 700 MHz~2.6 GHz frequency band that is currently being used for wireless communication), and the others are high frequency band carriers.

The low frequency carrier only carries a downlink synchronization channel and a master broadcast channel. Time-frequency positions of the downlink synchronization channel and the master broadcast channel are relatively fixed on the auxiliary carrier. The downlink synchronization channel is configured to synchronize time between the terminal and the cell and search for cells. Messages in the master broadcast channel indicate information such as the bandwidth of the auxiliary carrier, the system frame number of the auxiliary carrier, the frequency of the master carrier, the bandwidth of the master carrier, and the frame structure of the master carrier (TDD or FDD), etc.

A terminal that supports millimeter wave communication, by detecting the downlink synchronization channel in the frequency band of the auxiliary carrier, achieves downlink synchronization with the radio cell, and then by reading the master broadcast messages, the cell configuration information including main cell information such as system bandwidth and system frame numbers of the auxiliary carrier, the frequency of the master carrier, the bandwidth of the master carrier, and the frame structure of the master carrier (TDD or FDD) borne on the master broadcast channel is obtained. The radio terminal that obtains the above information may further read common broadcast messages from the master carrier, and obtain detailed configuration information of the master carrier, e.g., SRS configurations, PRACH configurations, etc.

A terminal that resides in a radio cell A, when there are downlink and uplink service requirements, or when it receives a paging message from the base state and the paging message contains an identity of the terminal (UE-Identity), needs to initiate a process of establishing a connection with the base station. During the process of establishing the connection, the terminal sends PRACH according to PRACH configurations of the cell and carries out receiving and sending of subsequent messages related to establishing the connection, until the terminal receives dedicated radio resource configuration information targeted for it. The radio resource configuration information dedicated for the terminal at least includes SRS dedicated configuration information of the terminal on the master carrier and on the auxiliary carriers, uplink control channel dedicated configuration information of the terminal on the master carrier, and downlink and uplink transmission channel dedicated configuration information of the terminal on the master carrier, etc.

The terminal that resides in the radio cell A, when it is in activated status, may send and receive downlink and uplink data over the master carrier.

Application Scenario 2

Figure 2:
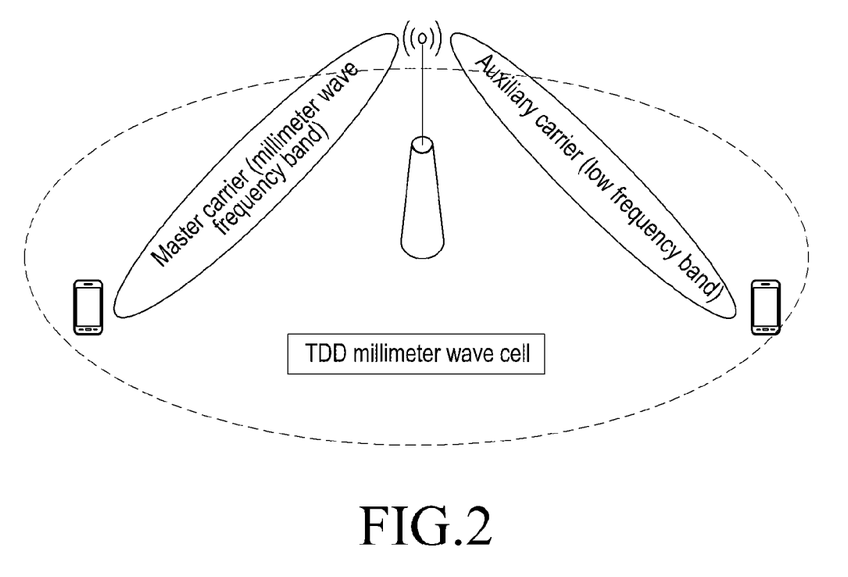
FIG. 2 shows an exemplary diagram of Embodiment 1 of the present application.

In the present example, as an example, the master carrier is a carrier in the millimeter frequency band, and the corresponding radio cell is a millimeter wave cell. As is shown in FIG. 2, a millimeter wave cell working in TDD mode supports two carries at the same time, in which the master carrier is in the millimeter wave frequency band, and the auxiliary carrier is in the low frequency band (e.g., 700 MHz-2.6 GHz frequency band that is currently being used for wireless communication)

Figure 3:
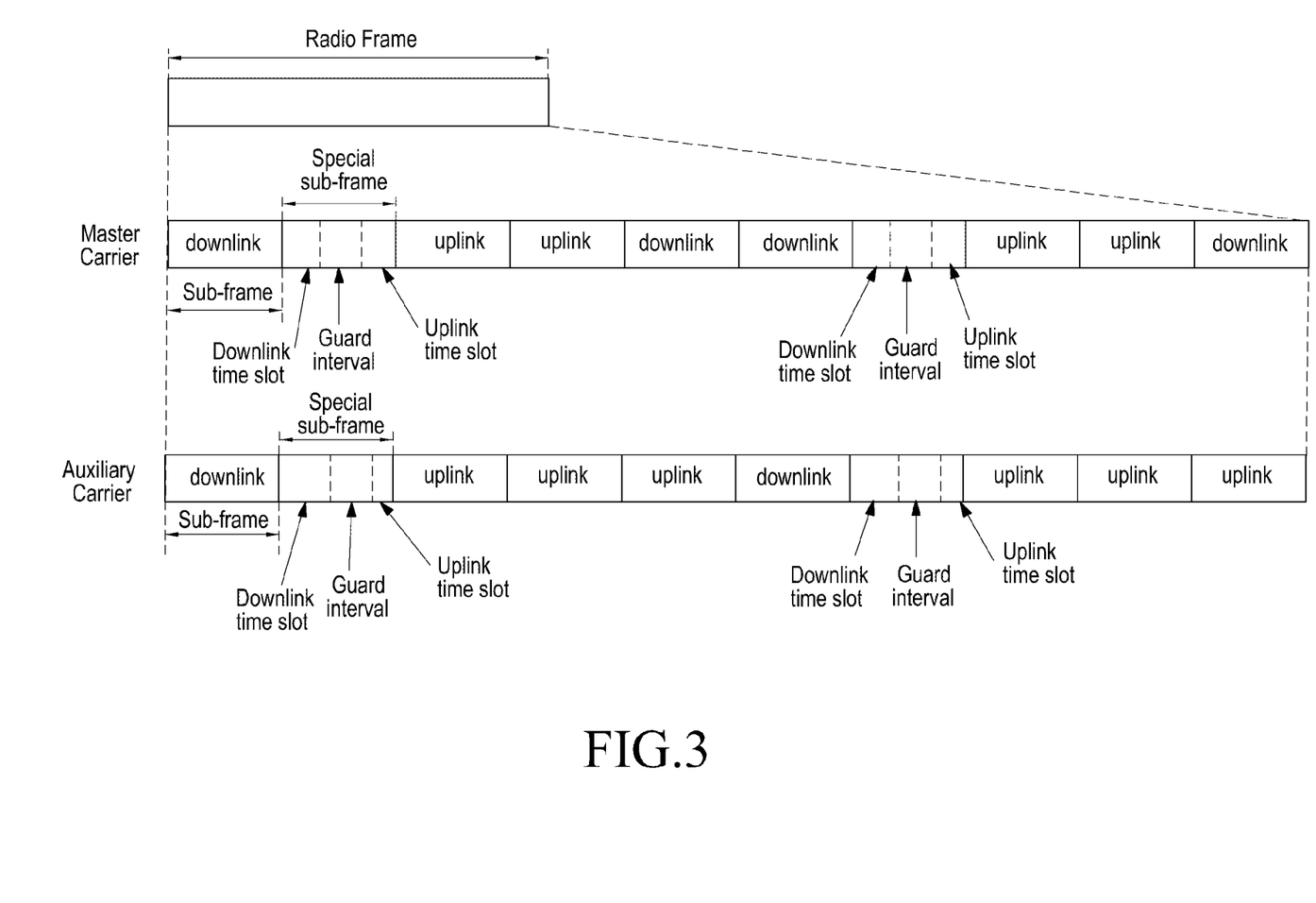
FIG. 3 shows an exemplary diagram of frame structures of a master carrier and an auxiliary carrier according to Embodiment 1 of the present application.

The radio frame structure on the master carrier is TDD mode. That is, a radio frame is divided into multiple sub-frames by time, and according to different configurations, these sub-frames are divided into downlink sub-frames, uplink sub-frames and special sub-frames. An example of this is shown in FIG. 3. an uplink time slot of the uplink sub-frames or the special sub-frames of the master carrier should be at least configured with SRS resources, and may be configured with PRACH resources.

The radio frame structure of the auxiliary carrier is also TDD mode, and ratios occupied by the downlink sub-frames, the uplink sub-frames, and the special sub-frames in the radio frame structure of the auxiliary carrier and their positions in the radio frame may be different from that of the master carrier.

The auxiliary carrier bears a synchronization channel and a master broadcast message on determined positions, and in addition, it may bear common system messages. The synchronization channel is used for downlink time synchronization of the terminal and the cell and searching for cells. The master broadcast message and the common system messages are used to indicate information such as the bandwidth of the auxiliary carrier, the frame number of the auxiliary carrier, the frequency of the main frequency, the bandwidth of the master carrier, the TDD configurations of the master carrier and the auxiliary carrier, and SRS public configurations on the master carrier, etc., the PRACH configurations on the master carrier (given that there are PRACH resources on the master carrier) and on the auxiliary carrier. PRACH resources may be configured for the auxiliary carrier to perform uplink synchronization between the terminal and the base station.

The terminal that supports the millimeter wave communication, by detecting the synchronization channel on the auxiliary carrier, achieves the downlink synchronization with the millimeter wave cell, and by reading the master broadcast message, obtains main cell information such as a system bandwidth and a system frame number of the auxiliary carrier, and then, reads some common broadcast messages to obtain common system messages carried in the auxiliary carrier, including: the frequency of master carrier, the bandwidth of master carrier, the TDD configurations of the master carrier and the auxiliary carrier, and SRS public configuration information on the master carrier, PRACH configurations on the master carrier (if there are PRACH resources on the master carrier) and on the auxiliary carrier.

The terminal that resides in the millimeter wave cell C, when it is in idle status, may only monitor a downlink control channel on the auxiliary carrier, and obtain paging messages and broadcast messages.

The terminal that resides in the millimeter wave cell C, when there are downlink and uplink service requirements, or receives a paging message from the base station, and the paging message contains an identity of the terminal (UE-Identity), needs to initiate a process of establishing a connection with the base station. During initiating the process of establishing the connection, the terminal sends PRACH according to the PRACH configurations of the cell and carries out sending and receiving of subsequent messages related to establishing the connection on the auxiliary carrier or on the master carrier, until wireless resource configuration information dedicated for the terminal is received. The wireless resource configuration information dedicated for the terminal may at least contain SRS dedicated configuration messages on the master carrier and the auxiliary carrier, the uplink control channel dedicated configuration information of the terminal on the master carrier and on the auxiliary carrier of the terminal, and the downlink and uplink dedicated configuration information of the terminal on the master carrier and on the auxiliary carrier.

The PRACH configurations of the cell may be PRACH configurations on the master carrier and/or PRACH configurations on the auxiliary carrier. If a purpose of the PRACH is to initiate establishment of an initial connection, then a carrier that sends and receives the messages related to the establishment of the connection is the same with that where the PRACH is located. When the mobile terminal sends the PRACH, if there are no PRACH configurations on the master carrier, and there are PRACH configurations on the auxiliary carrier, then the mobile terminal initiates the PRACH on the PRACH resources of the auxiliary carrier; and if PRACH configurations exist in both of the master carrier and the auxiliary, then the terminal may only initiate PRACH on the auxiliary carrier, or only initiate PRACH on the master carrier, or the location of initiating the PRACH may be decided according to a current radio environment (e.g., path loss). Preferably, for a terminal where the radio environment is relatively good (e.g., the radio environment is superior than a threshold), it may select the master carrier to initiate the PRACH, or otherwise, it may select the auxiliary carrier to initiate the PRACH; and if there are PRACH configurations on the master carrier, and there are no PRACH configurations on the auxiliary carrier, then the mobile terminal initiates the PRACH on the PRACH resources of the master carrier.

The terminal that resides in the millimeter wave cell C, when it is in activated status, may receive downlink data from the master carrier and the auxiliary carrier at the same time. For downlink transmission on the auxiliary carrier, the terminal detects a downlink transmission instruction targeted for the auxiliary carrier on the auxiliary carrier, and feeds back ACK/NACK information of the downlink transmission on the auxiliary carrier. For the downlink transmission on the master carrier, the terminal may detect a downlink transmission instruction targeted for the master carrier on the auxiliary carrier, and feed back ACK/NACK information of the downlink transmission by the auxiliary carrier. In this case, a feedback time sequence of the ACK/NACK of the downlink transmission may be decided by the uplink and downlink configurations of the master carrier and the auxiliary carrier; or the terminal may also detect the downlink transmission instruction targeted for the master carrier on the master carrier, and feed back the ACK/NACK of the downlink transmission by the master carrier.

When uplink data transmission is performed, the terminal may transmit uplink data on the master carrier and on the auxiliary carrier at the same time. For uplink transmission on the auxiliary carrier, the terminal receives uplink transmission scheduling targeted for the auxiliary carrier on the auxiliary carrier and receives uplink transmission feedback on the auxiliary carrier. For the uplink transmission on the master carrier, the terminal may receive uplink transmission scheduling targeted for the master carrier from the auxiliary carrier and receive the uplink transmission feedback from the auxiliary carrier. In this case, the time sequence of the uplink transmission is decided by the uplink and downlink configurations of the master carrier and the auxiliary carrier; or the terminal may receive uplink transmission scheduling targeted for the master carrier and receive uplink transmission feedback from the master carrier.

Application Scenario 3

Figure 4:
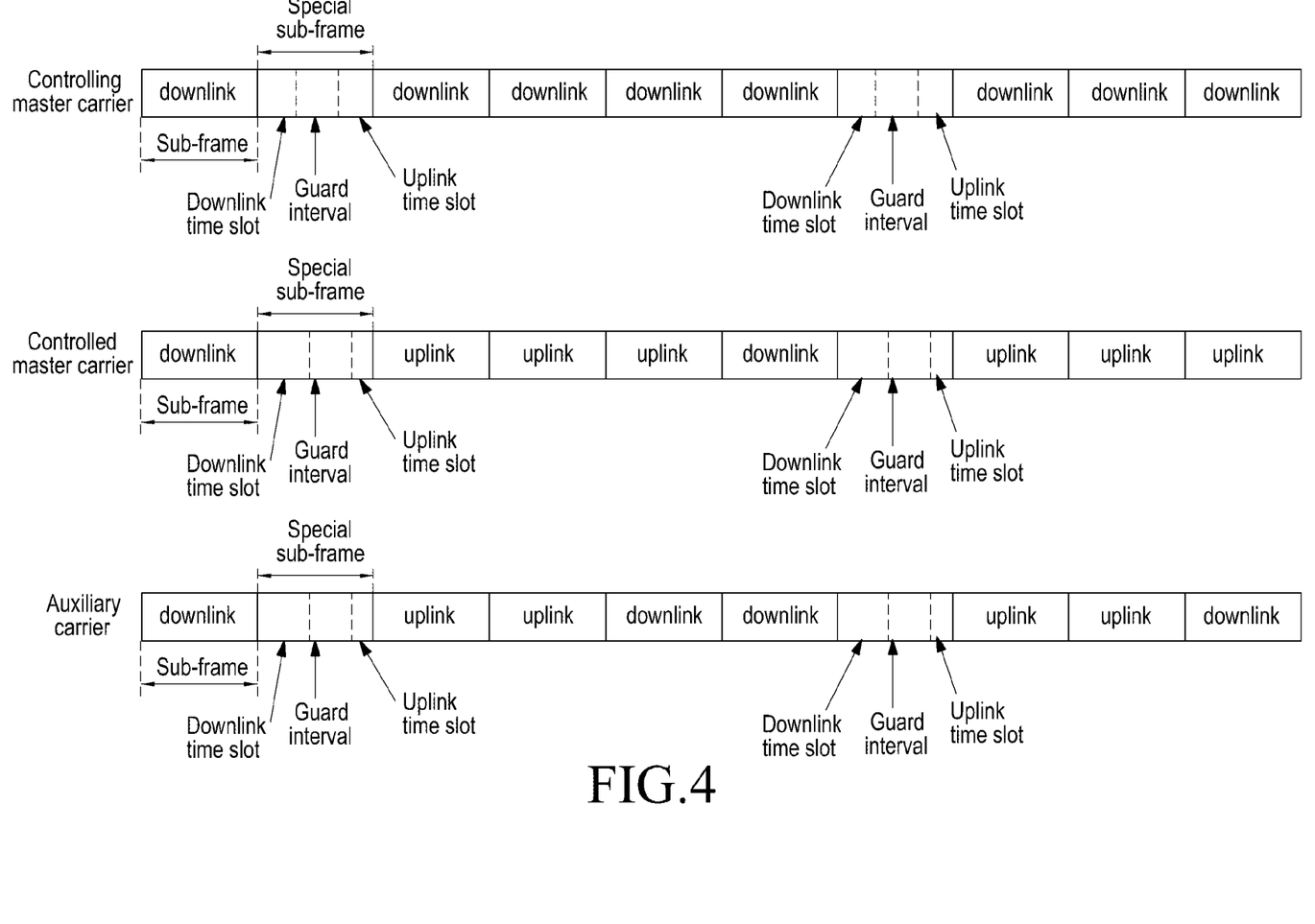
FIG. 4 shows an exemplary diagram of frame structures of a controlling master carrier, a controlled master carrier and an auxiliary carrier according to Embodiment 2 of the present application.

As is shown in FIG. 4, a millimeter wave cell that works in TDD mode supports three carriers at the same time, in which two master carriers are in millimeter wave frequency band, and one auxiliary carrier is in low frequency band (e.g., 700 MHz-2.6 GHz frequency band currently being used for wireless communication).

The radio frame structure on the master carrier is a hybrid duplex mode. That is, one of the master carriers is called a controlling master carrier. A radio frame structure of the controlling master carrier contains a "configurable sub-frame". The "configurable sub-frame" consists of a special downlink time slot, a guard time slot, and an uplink pilot time slot, and the total length thereof is a sub-frame, and other sub-frames in the radio frame are downlink sub-frames. The uplink pilot time slot in the configurable sub-frame of the controlling master carrier is at least configured with SRS resources.

Another master carrier is call controlled master carrier, and a radio frame structure of the controlled master carrier may be configured as a full uplink sub-frame carrier, or an uplink and downlink time division multiplex carrier: when the controlled master carrier is all uplink, it constitutes the traditional FDD mode to perform communication together with the controlling master carrier; when the controlled master carrier is an uplink and downlink time division multiplex carrier, the downlink on the controlling master carrier cooperates the uplink on the controlled master carrier to perform unequal-proportion FDD mode communication, and/or the downlink on the controlling master carrier cooperates with the uplink on the controlled master carrier to perform the traditional TDD mode communication; the uplink pilot time slot of the uplink sub-frame or the special sub-frame of the controlled carrier is at least configured with SRS configurations, and may be configured with PRACH configurations. The radio frame structure and communication mode of the controlling master carrier and the controlled master carrier may be realized in any way that meets the above rules, e.g., in a way as described in the application filed on Aug. 9, 2013, with the application number being CN201310347085.6.

The radio frame structure of the auxiliary carrier is TDD mode, and the proportions of the uplink sub-frames, downlink sub-frames, and special sub-frames in the radio frame structure of the auxiliary carrier may be different from that in the master carrier. The auxiliary carrier bears a synchronization channel and a master broadcast message on specific positions. In addition, it may bear a common system message, and the synchronization channel may be used to perform downlink time synchronization between the terminal and the cell, and search for cells. The master broadcast message and the common system message are configured to indicate information such as a bandwidth of the auxiliary carrier, a system frame number of the auxiliary carrier, a frequency of the master carrier, a bandwidth of the master carrier, TDD configurations of the master carrier and the auxiliary carrier, and public configurations of the SRS on the master carrier, the PRACH configurations on the master carrier (if there are PRACH resources existing on the master carrier) and on the auxiliary carrier. The auxiliary carrier should be configured with the PRACH resources, used for uplink synchronization between the terminal and the base station.

The terminal that supports the millimeter wave communication, when achieving the downlink synchronization and obtaining the cell configuration information, achieves the downlink synchronization with the millimeter wave cell by detecting the downlink synchronization channel on the frequency band of the auxiliary carrier, then obtains main cell information such as a system bandwidth and a system frame number of the auxiliary carrier by reading the master broadcast message, then reads a serial of common broadcast messages, indicating information such as the frequency of the master carrier, the bandwidth of the master carrier, TDD configurations of the controlled master carrier and the auxiliary carrier, the SRS public configurations on the controlling master carrier and on the controlled master carrier, the PRACH configurations on the controlled master carrier (if there are PRACH resources existing on the master carrier) and on the auxiliary carrier, etc.

uplink and downlink synchronization and cell configuration information, detects downlink synchronization channels on the frequency band of the auxiliary carrier, achieves downlink synchronization with the millimeter wave cell, then by reading the master broadcast message, obtains cell information such as system bandwidth of the auxiliary carrier and system frame number. Then, it obtains a series of common broadcast messages, obtains common system messages carried in the auxiliary carrier, instructs a frequency of the master carrier, the bandwidth of the master carrier, and the TDD configurations of the controlled master carrier and the auxiliary carrier, and the public configurations of SRR of the controlling master carrier and the controlled master carrier, and cell configuration information such as controlled master carrier (if there are PRACH resources existing in the master carrier) and the PRACH configurations on the auxiliary carrier.

The terminal that resides in the millimeter wave cell C, when in idle status, may monitor the downlink control channel on the auxiliary carrier to obtain paging messages and broadcast messages.

The terminal that resides in the millimeter wave cell C, when it has uplink and downlink service needs, or when it receives a paging message from the base station, and the paging message contains an identity of the terminal (UE-Identity), needs to initiate establishing the connection with the base station. During the process of initiating establishing the connection, the mobile terminal sends PRACH according to the PRACH configurations of the cell and carries out receiving and sending of messages related to subsequent connection establishment, until specific radio resource configuration information targeted for the terminal is received. The radio resource configuration information targeted for the terminal at least contains SRS specific configuration information of the terminal on the controlling master carrier, on the controlled master carrier, and on the auxiliary carrier, the uplink control channel specific configuration information of the terminal on the controlled master carrier and on the auxiliary carrier, the specific configuration information of the downlink and uplink transmission channels of the terminal on the controlled master carrier and on the auxiliary carrier, etc.

The PRACH configurations of the cell may be PRACH configurations on the controlled master carrier and/or PRACH configurations on the auxiliary carrier. When the mobile terminal sends the PRACH, if there are no PRACH configurations on the controlled master carrier, there are PRACH configurations on the auxiliary carrier, then the mobile terminal initiates PRACH on the PRACH resources of the auxiliary carrier; and if the PRACH configurations exist both on the controlled master carrier and on the auxiliary carrier, then the terminal may only initiate the PRACH on the auxiliary carrier, or initiate the PRACH on the controlled master carrier, or it decides the location to initiate the PRACH according to a current radio environment (e.g., path loss). Preferably, for a terminal with a good radio environment (e.g., the radio environment is superior than a predefined threshold), then the controlled master carrier may be selected to initiate the PRACH, or otherwise, the auxiliary carrier may be selected to initiate the PRACH; and if the PRACH configurations exist in the controlled master carrier, and there are no PRACH configurations on the auxiliary carrier, then the mobile terminal initiates the PRACH on the PRACH resources of the controlled master carrier.

The terminal that resides in the millimeter wave cell C, when in activated status, may receive downlink data from the controlling master carrier, the controlled master carrier and the auxiliary carrier. For downlink transmission on the auxiliary carrier, the terminal detects a downlink transmission instruction dedicated for the auxiliary carrier on the auxiliary carrier, and feeds back ACK/NACK information of the downlink transmission on the auxiliary carrier. For the downlink transmission on the controlling master carrier, the terminal may detect a downlink transmission instruction dedicated for the controlling master carrier, and feed back the ACK/NACK of the downlink transmission by using the auxiliary carrier. In this case, an ACK/NACK feedback time sequence of the downlink transmission may be decided by the uplink and downlink configurations of the auxiliary carrier. Or, the terminal may detect a downlink transmission instruction dedicated for the controlling master carrier on the controlling master carrier, and feed back the ACK/NACK of the downlink transmission by using the controlled master carrier. In this case, the ACK/NACK feedback time sequence of the downlink transmission is decided by the uplink and downlink configurations of the controlled master carrier. For downlink transmission on the controlled master carrier, the terminal may detect a downlink transmission instruction dedicated for the controlled master carrier on the auxiliary carrier, and feed back the ACK/NACK of the downlink transmission. In this case, the ACK/NACL feedback time sequence of the downlink transmission may be decided by the uplink and downlink configurations on the auxiliary carrier and on the controlled master carrier. Or, the terminal may also detect the downlink transmission instruction dedicated for the controlled master carrier on the controlling master carrier and feed back the ACK/NACK of the downlink transmission by using the controlled master carrier. In this case, the ACK/NACK feedback time sequence of the downlink transmission is decided by the uplink and downlink transmission configurations of the controlled master carrier. Or, the terminal may detect the downlink transmission instruction dedicated for the controlled master carrier on the controlled master carrier, and feed back the ACK/NACK of the downlink transmission via the controlled master carrier. In this case, the ACK/NACK feedback time sequence of the downlink transmission is decided by the downlink and uplink configurations of the controlled master carrier.

When performing the uplink data transmission, the terminal may send the uplink data on the controlled master carrier and on the auxiliary carrier. For uplink transmission on the auxiliary carrier, the terminal receives the uplink transmission scheduling dedicated for the auxiliary carrier and receives the uplink transmission feedback on the auxiliary carrier. For the uplink transmission of the controlled master carrier, the terminal may receive the uplink transmission scheduling dedicated for the master carrier and receive the uplink transmission feedback on the auxiliary carrier. In this case, the time sequence of the uplink transmission is decided by the uplink and downlink configurations of the auxiliary carrier and the controlled master carrier. Or the terminal may receive uplink transmission scheduling dedicated for the controlled master carrier on the controlling master carrier and receive the uplink transmission feedback on the controlling master carrier. In this case, the time sequence of the uplink transmission may be decided by the uplink and downlink configurations of the controlled master carrier.

In the above Scenario 2, a controlling master carrier and a controlled master carrier are used as an example for illustration. In fact, there may be a plurality of controlling master carriers and a plurality of controlled master carriers, in which each of the controlling master carriers and the controlled master carriers may be processed in a same way as described in the above, which will not be elaborated herein.

Figure 5:
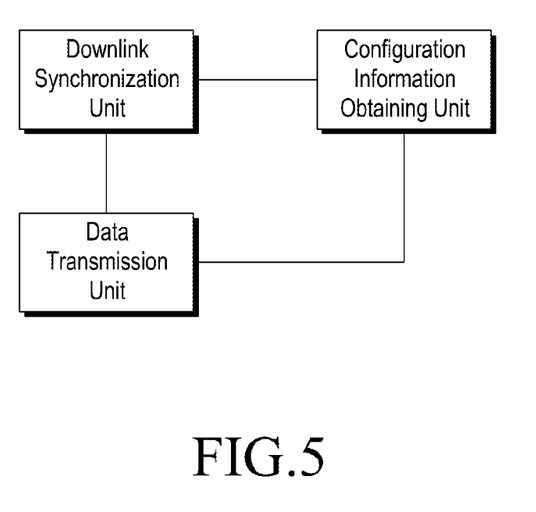
FIG. 5 shows a schematic diagram of a basic structure of a mobile terminal according to the present application.

The method for data transmission in a radio cell of the mobile terminal according to the present application is described as above. The present application also provides a mobile terminal, when it resides in a cell includes a low frequency band carrier and a high frequency band carrier, is configured to implement the above data transmission method. FIG. 5 shows a basic structure of the mobile terminal according to the present application. As shown in FIG. 5, the mobile terminal includes: a downlink synchronization unit, a configuration information obtaining unit and a data transmission unit.

The downlink synchronization unit is configured to realize initial downlink synchronization with a base station of the radio cell by using a downlink synchronization signal sent by the auxiliary carrier. The configuration information obtaining unit is configured to obtain configuration information of the radio cell, the master carrier and the auxiliary carrier. The data transmission unit is configured to transmit data by using the master carrier and/or the auxiliary carrier according to the configuration information of the radio cell, the master carrier and the auxiliary carrier.

Preferably, the auxiliary carrier may be used to transmit a downlink synchronization signal, a broadcast channel signal and/or a public control channel signal. When the radio cell transmits the downlink synchronization signal by using the auxiliary carrier, the downlink synchronization unit is further configured to receive the downlink synchronization signal sent by the auxiliary carrier and performs the initial downlink synchronization according to the downlink synchronization signal. When the radio cell transmits the broadcast channel signal by using the auxiliary carrier, there may be two specific transmission ways:

1) the configuration information obtaining unit is further configured to receive the master broadcast channel signal sent from the auxiliary carrier, obtain configuration information of the radio cell borne by the master broadcaster channel; and is also configured to read the common broadcast channel from the master carrier according to the configuration information of the radio cell borne by the master broadcast channel, and obtain the configuration information of the radio cell borne by the common broadcast channel; and 2) the configuration information obtaining unit is further configured to obtain the configuration information of the radio cell according to the master broadcast channel signal, the public control channel indication, and the common broadcast channel signal.

When the radio cell sends the public control signals by using the auxiliary carrier, the data transmission unit is further configured to receive the public channel signal sent by the auxiliary carrier and is further configured to transmit data according to the public channel signals.

In the data transmission method provided according to the present application, large point-to-multi-point coverage may be realized by using the auxiliary carrier so as to make up the transmission distance defect of the millimeter frequency band carrier on the point-to-multi-point data transmission, so as to improve the coverage of the millimeter cell and the transmission performance.

What is described above are only preferable embodiments of the present invention, and are not to limit the present invention, any modifications, equivalent replacements, improvements, etc. made within the spirit and principle of the present invention should be contained in the scope of the present invention.

What is claimed is:

1. A method for performing a random access in a wireless communication system, comprising:
    identifying, by a terminal, whether a cell for a random access procedure is configured with an auxiliary uplink carrier, wherein a frequency band of a main uplink carrier of the cell is higher than a frequency band of the auxiliary uplink carrier;
    identifying, by the terminal, whether a carrier to use for the random access procedure is explicitly signaled;
    identifying, by the terminal, whether a radio condition of the main uplink carrier related to path loss is less than a threshold;
    selecting, by the terminal based on the carrier to use for the random access procedure being not explicitly signaled, the cell for the random access procedure being configured with the auxiliary uplink carrier and the radio condition being less than the threshold, the auxiliary uplink carrier as an uplink carrier for the random access procedure;
    selecting, by the terminal based on the radio condition being not less than the threshold, or based on the cell for the random access procedure being not configured with the auxiliary uplink carrier, the main uplink carrier as the uplink carrier for the random access procedure; and
    performing, by the terminal, the random access procedure with the selected uplink carrier.

2. A terminal for performing a random access in a wireless communication system, comprising:
    a transceiver; and
    a controller coupled to the transceiver, wherein the controller is configured to:
        identify whether a cell for a random access procedure is configured with an auxiliary uplink carrier, wherein a frequency band of a main uplink carrier of the cell is higher than a frequency band of the auxiliary uplink carrier,
        identify, by the terminal, whether a carrier to use for the random access procedure is explicitly signaled,
        identify whether a radio condition of the main uplink carrier related to path loss is less than a threshold,
        based on the carrier to use for the random access procedure being not explicitly signaled, the cell for the random access procedure being configured with the auxiliary uplink carrier and the radio condition is less than the threshold, select the auxiliary uplink carrier as an uplink carrier for the random access procedure,
        based on the radio condition being not less than the threshold, or based on the cell for the random access procedure being not configured with the auxiliary uplink carrier, select the main uplink carrier as the uplink carrier for the random access procedure, and
        perform the random access procedure with the selected uplink carrier.

3. The method of claim 1, further comprising:
    based on the carrier to use for the random access procedure being explicitly signaled, selecting the signaled carrier as the uplink carrier for the random access procedure.

4. The terminal of claim 2, wherein the controller is further configured to, based on the carrier to use for the random access procedure being explicitly signaled, select the signaled carrier as the uplink carrier for the random access procedure.

* * * * *